UNITED STATES PATENT OFFICE 2,422,445

PROCESS OF RECOVERING TRIARYL-METHANE DYESTUFFS

Harvey Irvin Stryker, Carney's Point, N. J., and Ralph Otto Heuse, Wilmington, Del., assignors to E. I. du Pont de Nemours & Company, Wilmington, Del., a corporation of Delaware No Drawing. Application December 15, 1945, Serial No. 635,422

3 Claims. (Cl. 260—388)

This invention relates to a method of manufacturing triphenyl-methane and diphenyl-naphthyl-methane dyestuffs having high purity and improved solubility in water and castor oil. More particularly it relates to a method of manufacturing a dyestuff known as Victoria Pure Blue BO, which is essentially the hydrochloride of tetraethyl - diamino - diphenyl - ethyl - alpha-amino-naphthyl methane, possessing high purity and improved solubility in water and castor oil.

It is an object of this invention to provide an efficient and economical process for manufacturing triaryl-methane colors having the aforementioned improved qualities. Other and further important objects of this invention will appear as the description proceeds.

Castor oil solubility is a qualification imposed upon triaryl-methane colors by economic development in recent years, due to the use of these colors in the preparation of copying papers (so-called "carbon papers") wherein castor oil has come to be employed in continually increasing quantities, in preparing the coating for the paper. Triaryl-methane colors, and especially Victoria Pure Blue BO, as manufactured heretofore, have not generally possessed this property.

We have investigated this problem, and found that castor oil solubility is a function of the quantity of acid combined with the color in its so-called hydrochloride form or salt-form. To understand this point better, we shall take up Victoria Pure Blue BO as a typical example. This color, in form of base, has the formula

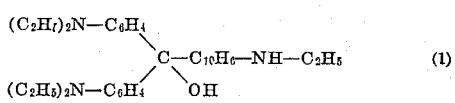

Upon treatment with hydrochloric acid, the OH radical is eliminated and 1 atom of Cl enters the molecule, which may be regarded as a removal of an $H_2O$ unit from the molecule and introduction in its place of 1 HCl unit. But remembering that the color has 3 amino groups, it is theoretically possible to combine the color base with 1, 2 or 3 units of HCl. Furthermore, since the reaction with HCl at any particular stage may not go to completion, the actual product may be a mixture of the monohydrochloride and dihydrochloride (possibly with some trihydrochloride), and the average HCl content of the dye may bear a fractional ratio to the molar quantity of the latter. Thus, the commercial salt of the dye may be represented by the formula $$[B]\cdot(HCl)_x \qquad (2)$$

wherein [B] represents the organic nucleus of the color, while the subscript $x$ may have any value between 0 and 3.

Our investigations revealed that most commercial samples of the color as hitherto marketed possess an average $x$-value of about 1.25 or higher. Furthermore, we found that these commercial grades are composite mixtures of which not more than 20% by weight is of a castor oil soluble nature. We found further that good solubility in castor oil is obtained only when the subscript $x$ in the above formula has a value not greater than 1.10. Since the color, to be acceptable in trade, must also be water-soluble, $x$ cannot be allowed to diminish below the value of 1.00. The problem therefore reduces itself to finding a simple, and practical process for producing triamino-triaryl-methane colors of the general formula (2) above, wherein [B] represents the fundamental nucleus of the color molecule, while $x$ has a value between the limits 1.00 and 1.10. Coupled with this problem is also the problem of how to obtain the color in a high state of purity, free from tarry by-products.

Going back now to the practice of the art, it is old to purify colors of the triamino-triaryl-methane series by extracting an aqueous solution of a salt thereof by means of an organic liquid, such as toluene, which dissolves the impurities but not the color. (Frank, U. S. P. 2,181,369.) It is also old to increase the water-solubility of dyestuffs of the above class by converting them into salts of phosphoric acid. (Müller, U. S. P. 1,978,755.) In a former application by one of these inventors (Stryker, Ser. No. 415,947), it has further been proposed to combine the above two ideas, extracting an aqueous solution of a salt of the color with an organic solvent such as toluene, the salt for this purpose being selected as acetate or phosphate. None of these suggestions, however, considered the problem of castor oil solubility and none of these references in the art taught how to proceed to obtain a product having both satisfactory castor oil solubility and satisfactory water-solubility.

Now we have found that the above problem of procedure may be neatly solved by modifying the process of manufacture of Victoria Pure Blue BO in such a manner as to include in the recovery a step wherein a solution of the base in an organic solvent, such as toluene, is treated with an aqueous solution of acid whereby to transfer the color into the aqueous phase while leaving the tarry impurities in the organic solvent phase, this extraction, however, being carried out under such conditions that the pH value of the aqueous phase, after it has absorbed the dye, shall fall within a specified, narrow range and, more particularly, between the limits 3.5 and 5.0.

To explain this improved process more clearly, the following is in general words our complete process for manufacturing Victoria Pure Blue BO, according to this invention:

Tetraethyl diamino benzophenone (ethyl ketone) is dissolved in toluene and treated with about one chemical equivalent of phosphorus oxychloride. Then about one chemical equivalent of monoethyl-alpha-naphthylamine is added to the melt, which is then warmed until the formation of color complex is complete. The reaction mass now contains the color in the form of a complex addition compound with $POCl_3$. When the reaction is complete, aqueous sodium hydroxide is added until the color complex is broken up and the aqueous layer remains strongly alkaline. Additional toluene is then added to the toluene solution of the color base to prevent emulsification with the aqueous layer during the washing of the toluene layer. The aqueous layer is separated from the toluene solution which contains the color base, and the toluene solution is washed with water until it is essentially free from alkali. The washed toluene solution is extracted with a dilute aqueous solution of an acid or a mixture of acids so that the color is essentially all extracted, but the tars and other impurities remain in the toluene. This is best done by extracting the color base with a mixture of acetic and hydrochloric acids where the molar ratio for acetic to hydrochloric acid is about 4, so that excessive acidity is avoided at all times, but no considerable amount of color base remains in the toluene. The pH value of the extracting liquor under these conditions is between 3.5 and 4.5. The color is then isolated from the water solution by the usual salting procedure and dried. The triarylmethane color obtained in this manner is of high purity, dissolves easily and completely in water without leaving a tarry residue, and possesses further the remarkable property of being substantially completely soluble in castor oil (soluble components=95 to 98% by weight), provided of course sufficient castor oil is employed to avoid forming a saturated solution. (As a standard test for this purpose we have been employing 100 gms. of the oil for 10 gms. of the color.)

In the above process, a single extraction may not extract all the color from the toluene. Any residual color may then be extracted by a second treatment with aqueous acid of stronger acidity than pH 3.5. The color obtained in this second step may be packaged and marketed separately as a common grade of this color without warranty as to its behavior in castor oil. On the other hand, if the quantity of aqueous acid used in the second extraction step is small, and its admixture with the first aqueous extract will not cause the pH of the combined extracts to drop below 3.5, the combined extracts may be salted out to give a product of satisfactory solubility in both castor oil and water.

In lieu of the particular acid mixture above specified, any other aqueous acid solution may be employed, even if it contain hydrochloric acid alone, or any other acid, for instance phosphoric, sulfuric, or acetic, provided that in the case of the stronger acids the latter are fed into the aqueous mass gradually so as to avoid overshooting the end point and forming an aqueous mass of acidity greater than pH 3.5.

The advantages shown by our invention are readily apparent when this product is compared with a grade of Victoria Pure Blue BO which has been recovered by an extraction step as above except that no regard is given to controlling the pH of the acid used in the extraction, or by comparing it with color which has been recovered without toluene extraction altogether, the color being isolated directly from the water solution obtained by drowning the condensation melt. In these latter cases the color is lower in chemical purity and inferior in brightness and purity of tone; it dissolves in water to leave a tarry residue; and, finally, the color is almost totally insoluble in castor oil.

The disadvantage in manufacturing a dyestuff which is lacking in brightness and strength is obvious. One of the important uses of Victoria Blue BO is in the preparation of phosphomolybdo-tungstic-acid complexes. When a color which dissolves in water to leave a tarry residue is used to prepare these complexes then inferior toners, which are weak and possess undesirable working properties are obtained. Another important use of Victoria Pure Blue BO is in the preparation of carbon paper and typewriter ribbon inks. Certain manufacturers have found it desirable to include castor oil in the make-up of the ink vehicle. Therefore it is readily seen that solubility of the dye in castor oil is a very desirable property.

Without limiting our invention the following examples are given to illustrate our preferred mode of operation. Parts mentioned are by weight.

*Example 1*

148 parts of toluene are charged into a flask and 168 parts of tetraethyl-diamino benzophenon ("ethyl ketone") are added with agitation. 120 parts of phosphorus oxychloride are then added followed by 90 parts of monoethyl alpha-naphthylamine. The charge is warmed up, and after formation of the color complex is complete, the mass is poured into a flask containing 1900 parts of water, 675 parts of 30% caustic soda solution and 200 parts of toluene. The mixture is then refluxed until basification of the color complex is complete. The water layer is separated, and the toluene layer is washed with water until the washings are no longer alkaline to Brilliant Yellow paper.

1700 parts of water, 22 parts of glacial acetic acid and 15 parts of 22% hydrochloric acid are now added and the mixture is refluxed for 45 minutes and allowed to settle. The aqueous layer is drawn off to a salting beaker and the toluene layer is again treated with 1,200 parts of water, 13 parts of acetic acid and 9 parts of 22% hydrochloric acid. After again refluxing the mixture for 45 minutes the aqueous layer is once more separated and run to the salting beaker. The pH of the first aqueous layer is about 4.8 and the pH of the second aqueous layer is about 2.8, while the pH of the combined aqueous extraction solutions lies near 4. The combined aqueous layers are heated to 75° C. and treated with a saturated aqueous solution containing 66 parts of common salt. The color is drawn off into a pan and dried in vacuo at 80° C. for about 24 hours until it is dry in appearance. The yield is 222 parts of color which is characterized by a high chemical purity, easy solubility in water and castor oil, and brightness of shade.

Example 2

The procedure of Example 1 is followed up to and including the acid extraction of the color base from the toluene solution, except that a mixture of 21 parts of glacial acetic acid and 12.4 parts of 65% phosphoric acid solution is substituted for the mixture of acetic and hydrochloric acid used in the first extraction, while 12.4 parts of 65% phosphoric acid solution alone are used in place of the acid mixture for the second extraction. The volumes and procedure for extraction remain the same as in Example 1, and the color is isolated by the addition of brine as before. The pH of the first extraction solution is about 4.8 and the pH of the second is about 3.0, while the pH of the combined extraction solutions is near 4. The yield is 222 parts of dry color which is characterized by high chemical purity, easy solubility in water and castor oil, and brightness and purity of tone.

Example 3

The procedure of Example 1 is followed up to but not including the extraction of the color base from the toluene solution. Then 1700 parts of water are added to the toluene solution, and 22% hydrochloric acid solution is added in small increments, following reflux periods of about an hour each, until the pH of the aqueous layer, as shown by test samples, is about 3.5. The exact amount of acid cannot be specified since it will depend upon the yield of color obtained in the fusion step, and enough acid must be added to extract essentially all the color, but an excess of acid which would lower the pH excessively is to be avoided. The hydrochloric acid is added in small increments to avoid the rapid change in pH which occurs when all the color has been extracted. The color is isolated and dried as before. The yield is 220 parts of Victoria Pure Blue BO which is characterized by high purity, easy solubility in water and castor oil and brightness and purity of tone.

In a similar manner aqueous solutions of other acids, for instance sulfuric or phosphoric, by themselves or in admixture with acetic acid, may be employed in the aqueous extracting liquor in lieu of the acids specified in the above examples.

In lieu of toluene in the above examples, other convenient organic solvents may be employed, for instance, benzene, xylene, monochloro-benzene, o-dichlorobenzene and o-chlorotoluene.

The principle of this invention may be applied in like manner and with similar results to the extraction of other triamino-triaryl-methane or triamino-diaryl-naphthyl methane colors, for instance, Victoria Blue B, (Color Index #729), Crystal Violet, (Color Index #681), or Methyl Violet, (Color Index #680), except that the exact numerical limits of $x$ in Formula 2 above and the exact numerical limits of the pH value of the extracting acid may vary from case to case and may be determined in each case by a little experimentation.

The pH-value of the extracting liquid may be higher than 4.8, say up to 5.0, if a second extraction step is practiced (as illustrated in Examples 1 and 2 above), inasmuch as liquors of the higher pH values often leave too much of the color dissolved in the organic phase.

Other variations in details of procedure will be readily apparent to those skilled in the art.

We claim as our invention:

1. In a process of producing Victoria Pure Blue BO wherein a solution of the color base in an organic solvent is extracted by means of aqueous acid, the improvement which consists in controlling the acidity of the aqueous extracting liquor so as to end up with an aqueous phase having an acidity between the values pH 3.5 and pH 5.0, whereby to obtain in the aqueous phase a salt of the color which upon salting out from said aqueous phase yields a product which is soluble both in water and in castor oil.

2. A process for producing Victoria Pure Blue BO in a form which is soluble both in water and in castor oil, which comprises (a) reacting tetraethyl-diamino-diphenyl ketone with ethyl-alpha-naphthylamine and phosphorus oxychloride in toluene, (b) treating the reaction mass with aqueous sodium hydroxide to form a solution of the color base in toluene, (c) washing the toluene solution with water until free of alkali, (d) treating the aforementioned toluene solution with an aqueous solution of acid whose acidity is calculated to produce after reaction with the color base a pH value between 3.5 and 4.8, whereby to transfer the color from the toluene phase into the aqueous phase, and (e) salting out the color from said aqueous extracts by the aid of sodium chloride.

3. A process as in claim 2, wherein the acid employed in step (d) is a mixture of hydrochloric and acetic acids in the ratio of 4 moles of acetic acid to 1 mole of hydrochloric acid.

HARVEY IRVIN STRYKER.
RALPH OTTO HEUSE.

REFERENCES CITED

The following references are of record in the file of this patent:

UNITED STATES PATENTS

| Number | Name | Date |
|---|---|---|
| 2,337,425 | Stryker | Dec. 21, 1943 |